(12) United States Patent  (10) Patent No.: US 9,297,899 B2
Newman et al.  (45) Date of Patent: Mar. 29, 2016

(54) DETERMINING EXTRINSIC CALIBRATION PARAMETERS FOR A SENSOR

(71) Applicant: The Chancellor Masters and Scholars of The University of Oxford, Oxford, Oxfordshire (GB)

(72) Inventors: Paul Michael Newman, Oxfordshire (GB); William Paul Maddern, Bisbane (AU); Alastair Robin Harrison, Oxfordshire (GB); Mark Christopher Sheehan, Oxfordshire (GB)

(73) Assignee: The Chancellor Masters and Scholars of the University of Oxford (GB)

( * ) Notice: Subject to any disclaimer, the term of this patent is extended or adjusted under 35 U.S.C. 154(b) by 0 days.

(21) Appl. No.: 14/348,482

(22) PCT Filed: Sep. 27, 2012

(86) PCT No.: PCT/GB2012/052393
§ 371 (c)(1),
(2) Date: Mar. 28, 2014

(87) PCT Pub. No.: WO2013/045927
PCT Pub. Date: Apr. 4, 2013

(65) Prior Publication Data
US 2014/0240690 A1 Aug. 28, 2014

(30) Foreign Application Priority Data
Sep. 30, 2011 (GB) .................................. 1116961.2

(51) Int. Cl.
*G01S 17/02* (2006.01)
*G01S 7/48* (2006.01)
(Continued)

(52) U.S. Cl.
CPC ............... *G01S 17/02* (2013.01); *G01S 7/4808* (2013.01); *G01S 7/4972* (2013.01); *G01S 17/87* (2013.01); *G01S 17/89* (2013.01)

(58) Field of Classification Search
CPC ............... G01S 17/023; G05D 1/0214–1/0278
USPC ............. 356/3.01–3.15, 4.01–4.1, 5.01–5.15, 356/6–22, 28, 28.5
See application file for complete search history.

(56) References Cited

U.S. PATENT DOCUMENTS

| 5,517,419 A | 5/1996 | Lanckton et al. |
| 6,194,860 B1 | 2/2001 | Seelinger et al. |

(Continued)

FOREIGN PATENT DOCUMENTS

| GB | 2162014 A | 1/1986 |
| WO | 2013045917 A1 | 4/2013 |

(Continued)

OTHER PUBLICATIONS

James P. Underwood et al (Error Modeling and Calibration of Exteroceptive Sensors for Accurate Mapping Applications).*

(Continued)

*Primary Examiner* — Luke Ratcliffe
(74) *Attorney, Agent, or Firm* — Finch & Maloney PLLC (57) ABSTRACT

A method of determining extrinsic calibration parameters for at least one sensor (102, 104, 106) mounted on transportable apparatus (100). The method includes receiving (202) data representing pose history of the transportable apparatus and receiving (202) sensor data from at least one sensor mounted on transportable apparatus. The method generates (204) at least one point cloud data using the sensor data received from the at least one sensor, each point in a said point cloud having a point covariance derived from the pose history data. The method then maximizes (206) a value of a quality function for the at least one point cloud, and uses (208) the maximized quality function to determine extrinsic calibration parameters for the at least one sensor.

20 Claims, 3 Drawing Sheets

(51) Int. Cl.
 G01S 7/497 (2006.01)
 G01S 17/87 (2006.01)
 G01S 17/89 (2006.01)

(56) References Cited

U.S. PATENT DOCUMENTS

| | | | |
|---|---|---|---|
| 7,693,654 | B1 | 4/2010 | Dietsch et al. |
| 8,290,305 | B2 | 10/2012 | Minear et al. |
| 8,447,474 | B2 | 5/2013 | Breed |
| 8,626,392 | B2 | 1/2014 | Kojo |
| 2007/0071311 | A1 | 3/2007 | Rovira-Mas et al. |
| 2008/0033645 | A1 | 2/2008 | Levinson et al. |
| 2009/0005961 | A1 | 1/2009 | Grabowski et al. |
| 2010/0106356 | A1 | 4/2010 | Trepagnier et al. |
| 2010/0114416 | A1 | 5/2010 | Au et al. |
| 2010/0121577 | A1 | 5/2010 | Zhang et al. |
| 2010/0183192 | A1 | 7/2010 | Fritsch et al. |
| 2010/0245573 | A1 | 9/2010 | Gomi et al. |
| 2010/0253593 | A1 | 10/2010 | Seder et al. |
| 2012/0050525 | A1 | 3/2012 | Rinner et al. |
| 2012/0123642 | A1 | 5/2012 | Kojo |
| 2012/0203431 | A1 | 8/2012 | Kojo et al. |
| 2012/0218125 | A1 | 8/2012 | Demirdjian et al. |
| 2013/0120578 | A1 | 5/2013 | Iga et al. |
| 2013/0162829 | A1 | 6/2013 | Kadowaki et al. |
| 2014/0233010 | A1 | 8/2014 | Baldwin et al. |
| 2014/0240501 | A1 | 8/2014 | Newman et al. |
| 2014/0249752 | A1 | 9/2014 | Napier et al. |

FOREIGN PATENT DOCUMENTS

| | | |
|---|---|---|
| WO | 2013045927 A1 | 4/2013 |
| WO | 2013045935 A1 | 4/2013 |

OTHER PUBLICATIONS

Mark Sheehan et al (Automatic Self-Calibration of a Full Field-of-View 3D n-Laser Scanner).*

Spoerri, Anselm, "Novel Route Guidance Displays", Department of Civil Engineering, Massachusetts Institute of Technology, IEEE Vehicle Navigation & Information Systems Conference, Oct. 1993, Ottawa, Canada, 0-7803-1235-X93, pp. 419-422, 4 pages.

Scott-Young, Stephen, "Seeing the Road Ahead: GPS-Augmented Reality Aids Drivers", The University of Melbourne, GPS World Magazine, Nov. 1, 2003, vol. 14, Issue No. 11, Advanstar Communications, Inc., Accession No. 00968894, 2 pages.

International Preliminary Report on Patentability received for Patent Application No. PCT/GB2012/052393, mailed on Apr. 10, 2014, 8 pages.

Levinson et al., "Robust Vehicle Localization in Urban Environments Using Probabilitic Maps", Stanford University, 2010 IEEE International Conference on Robotics and Automation, May 2010, pp. 4372-4378, 7 pages.

Glennie et al., "Static Calibration and Analysis of the Velodyne HDL-64E S2 for High Accuracy Mobile Scanning", Remote Sensing, 2, 1610-1624; doi: 10.3390/rs 2061610, 15 Pages.

Harrison et al., "TICSync: Knowing When Things Happened", 2011 IEEE International Conference on Robotics and Automation, May 2011, pp. 356-363, 8 pages.

International Preliminary Report on Patentability received for Patent Application No. PCT/GB20121052381, mailed on Apr. 10, 2014, 11 pages.

International Search Report and Written Opinion of the International Searching Authority received for Patent Application No. PCT/GB2012/052381, mailed on Dec. 12, 2012, 17 pages.

GB Intellectual Property Office Search Report under Section 17(5) received for GB Patent Application No. 1116959.6 mailed Jan. 24, 2012, 3 pages.

Stewart, et al., "LAPS-Localisation using Appearance of Prior Structure: 6DoF Monocular Camera Localisation using Prior Pointclouds," IEEE International Conference on Robotics and Automation, RiverCentre, Saint Paul, Minnesota, May 14-18, 2012, pp. 2625-2632.

Cole, et al., "Using Laser Range Data for 3D SLAM in Outdoor Environments," IEEE International Conference on Robotics and Automation, Orlando, Florida, May 15-19, 2006, pp. 1556-1563.

Baldwin, et al., " Road vehicle localization with 2D push-broom LIDAR and 3D priors," IEEE International Conference on Robotics and Automation, RiverCentre, Saint Paul, Minnesota, May 14-18, 2012, pp. 2611-2617.

Wulf, et al., "Robust Self-Localization in Industrial Environments based on 3D Ceiling Structures," IEEE International Conference on Intelligent Robots and Systems, Oct. 9-15, 2006, Beijing, China, pp. 1530-1534.

Viola, et al., "Alignment by Maximization of Mutual Information," International Journal of Computer Vision, Kluwer Academic Publishers, vol. 24, No. 2, Sep. 1, 1997, pp. 137-154.

Weste, et al., "Dynamic Time Warp Pattern Matching Using an Integrated Multiprocessing Array," IEEE Transactions on Computers, vol. C-32, No. 8, Aug. 1, 1983, pp. 731-744.

International Preliminary Report on Patentability received for Patent Application No. PCT/GB2012/052402, mailed on Apr. 10, 2014, 8 pages.

International Search Report and Written Opinion of the International Searching Authority received for Patent Application No. PCT/GB2012/052402, mailed on Dec. 6, 2012, 12 pages.

GB Intellectual Property Office Search Report under Section 17(5) received for GB Patent Application No. 1116958.8, mailed Dec. 15, 2011, 3 pages.

Furgale et al., "Visual Teach and Repeat for Long-Range Rover Autonomy," Journal of Field Robotics, vol. 27, No. 5, Sep. 1, 2010, pp. 534-560.

Lategahn, et al., "Visual SLAM for Autonomous Ground Vehicles," IEEE International Conference on Robotics and Automation, May 9-13, 2011, 6 pages.

Royer et al., "Monocular Vision for Mobile Robot Localization and Autonomous Navigation," International Journal of Computer Vision, Kluwer Academic Publishers, BO, vol. 74, No. 3, Jan. 13, 2007, pp. 237-260.

Scaramuzza, et al., "Exploiting Motion Priors in Visual Odometry for Vehicle-Mounted Cameras with Non-holonomic Constraints," IEEE/RSJ International Conference on Intelligent Robots and Systems, Sep. 25-30, 2011, 8 pages.

Segvic, et al., "A mapping and localization framework for scalable appearance-based navigation," Computer Vision and Image Understanding, Academic Press, US, vol. 113, No. 2, Feb. 1, 2009, pp. 172-187.

Tomasi, et al., "Shape and Motion from Image Streams Under Orthography: A Factorization Method," International Journal of Computer Vision, Kluwer Academic Publishers, Norwell, US, vol. 9, No. 2, Nov. 1, 1992, pp. 137-154.

International Preliminary Report on Patentability received for Patent Application No. PCT/GB2012/052398, mailed on Apr. 10, 2014, 8 pages.

International Search Report and Written Opinion of the International Searching Authority received for Patent Application No. PCT/GB2012/052398, mailed on Dec. 6, 2012, 13 pages.

GB Intellectual Property Office Search Report under Section 17(5) received for GB Patent Application No. 1116960.4 mailed Jul. 6, 2012, 3 pages.

International Search Report and Written Opinion of the International Searching Authority received for Patent Application No. PCT/GB2012/052393, mailed on Jan. 3, 2013, 12 pages.

GB Intellectual Property Office Search Report under Section 17(5) received for GB Patent Application No. 1116961.2 mailed Mar. 22, 2012, 3 pages.

Jordt, et al., "Automatic High-Precision Self-Calibration of Camera-Robot Systems," IEEE International Conference on Robotics and Automation, Kobe, Japan—May 12-17, 2009, pp. 1244-1249.

(56) References Cited

OTHER PUBLICATIONS

Moosmann, et al., "Velodyne Slam," IEEE Intelligent Vehicle Symposium (IV), Baden-Baden, Germany—Jun. 5-9, 2011, pp. 393-398.
Underwood, et al., "Error Modeling and Calibration of Exteroceptive Sensors for Accurate Mapping Applications," Journal of Field Robotics, vol. 27, No. 1., Jan. 1, 2010, pp. 2-20.
Sheehan, et al., "Automatic Self-Calibration of a Full Field-Of-View 3D n-Laser Scanner," International Symposium on Experimental Robotics, Delhi, India, Dec. 18, 2010, 14 pages.
Saez, et al., "Underwater 3d SLAM through Entropy Minimization," IEEE International Conference on Robotics and Automation, Orlando, Florida—May 15-19, 2006, pp. 3562-2567.

* cited by examiner

DETERMINING EXTRINSIC CALIBRATION PARAMETERS FOR A SENSOR

The present invention relates to determining extrinsic calibration parameters for at least one sensor mounted on transportable apparatus.

Light Detection and Ranging (LIDAR) sensors have emerged as a dominant sensor in mobile robotics over the past decade. A LIDAR is often the primary source of sensor data for robots performing Simultaneous Localising and Mapping (SLAM), 3D reconstruction, obstacle detection and avoidance, feature detection and scene classification, as well as many other applications in the field of mobile robotics. The active nature of LIDARs make them an attractive sensor for outdoor mobile robots: LIDARs can detect scene structure and appearance regardless of background illumination.

The utility of a LIDAR as a sensor for outdoor mobile robots has been used in vehicles having a combination of 2D and 3D LIDARs. For data consistency, each of these sensors require an extrinsic calibration to recover the offset between the sensor frame and the vehicle base frame. The majority of current LIDAR calibration techniques involve one or more of the following: a supervised calibration procedure, known calibration targets, an artificial calibration environment, assumptions about the structure of the environment, arbitrary tuning parameters, or lengthy computation time.

Existing work has addressed the problem of determining the location of one or more LIDARs relative to a vehicle base frame. It is typically not feasible to measure the rigid transformation directly (and alignment errors of only 1 degree can result in measurement errors of over 0.25 m at a distance of 15 m), so the most common approach is to perform a calibration routine with all sensors rigidly attached to the vehicle as it moves through an environment. One known approach to recover the extrinsic calibration parameters is to include them as additional states in a metric SLAM system. One known method constructs a pose-graph, which when solved using graph-based optimization provides an estimate of the path taken by a robot through an environment along with the local offsets of a 2D LIDAR in the x-y plane and the diameter of the robot's wheels. Another similar known approach applies manifold-based optimization to solve a number of extrinsic calibration scenarios. An observability analysis of required vehicle motion for successful calibration is done in another known method, which calibrates for extrinsics of multiple 2D LIDAR sensors on a moving platform. However, these methods have so far been restricted to 2D LIDARs experiencing only planar motion.

Extrinsic calibration of 2D LIDAR sensors on a vehicle platform experiencing 3D motion presents a greater challenge. One known approach uses a pole with retro-reflective tape applied in known locations as a calibration target in an environment with a flat ground plane. After driving the vehicle past the pole multiple times with a 2D LIDAR fixed rigidly to the vehicle, an optimization procedure determines the calibration parameters which provide the most accurate 3D reconstruction of the pole. Another known calibration technique uses multiple retro-reflective markers in an unknown environment and an efficient second-order cone-based optimization. Both of these methods rely on known calibration targets to aid in the construction of a 3D point cloud from 2D scans.

A 2D LIDAR does not generally provide enough coverage to construct a 3D point cloud for calibration purposes. Fixed 2D LIDARs are typically configured as either forward facing or push-broom. Forward-facing 2D LIDARs observe a planar "slice" of the environment from many different locations, but typically struggle with vehicle pitch and roll and related effects such as ground-strike in general 3D vehicle motion. The availability of full-field 3D LIDAR systems (which are substantially more costly than 2D LIDARs), such as the known Velodyne, permits extrinsic calibration with no prior knowledge of the environment and no requirement for calibration targets, instead, extrinsic calibration parameters are chosen to maximise a point cloud quality metric.

A known approach finds both extrinsic and intrinsic calibration parameters for Velodyne HDL-64E on a moving vehicle platform. The optimization function seeks to minimize ICP-like point-to-plane distances using surface normals generated from local neighbourhoods. A grid search strategy is used to derive the optimal calibration parameters. While this method does not require any modification of the environment, the normal computation step will perform best in environments which are locally planar (generally valid in urban areas).

Embodiments of the present invention are intended to address at least some of the above problems. Embodiments of the present invention provide a method in the form of an unsupervised algorithm of determining extrinsic calibration parameters between 2D and 3D LIDAR sensors with respect to a vehicle base frame. Embodiments can recover the calibration parameters by optimising the quality of a 3D point cloud produced by the vehicle as it traverses an unknown, unmodified environment. The point cloud quality metric can be derived from Renyi Quadratic Entropy and may quantify the compactness of the point distribution using only a single turning parameter. Embodiments can also provide a fast approximate method to reduce the computational requirements of the entropy evaluation, allowing unsupervised calibration in vast environments with millions of points.

According to a first aspect of the present invention there is provided a method of determining extrinsic calibration parameters for at least one sensor mounted on transportable apparatus, the method including or comprising:

receiving data representing pose history of the transportable apparatus;

receiving sensor data from at least one sensor mounted on transportable apparatus;

generating at least one point cloud datum using the sensor data received from the at least one sensor, each point in a said point cloud having a point covariance derived from the pose history data;

maximising a value of a quality function for the at least one point cloud, and using the maximised quality function to determine extrinsic calibration parameters for the at least one sensor.

The value of the quality function may depend on pairwise distances between said points in a said point cloud ($\hat{X}$) and associated said point covariance ($\Sigma$) of each said point derived from the pose history data.

The quality function may be expressed as $E(\Box|Z, Y)$, where Z represents the data received from one said sensor, the sensor data representing a set of measurements over a period of time, and where Y represents a set of poses of the transportable apparatus from the pose history over the period of time, and where $\Box$ provides a most likely estimate for the extrinsic calibration parameters for the sensor.

The quality function may be an entropy-based point cloud quality metric. The quality function may be based on Renyi Quadratic Entropy (RQE).

The maximising of the value of the quality function can be performed using Newton's method or another gradient-based optimization algorithm.

In one embodiment the method can be used to:

generate a first point cloud based on sensor data received from a 3D LIDAR device;

generate a second point cloud based on sensor data received from a 2D LIDAR device, and use a Kernelized Renyi Distance function on the first and the second point clouds to determine the extrinsic calibration parameters for the 2D LIDAR device.

In the step of maximising the value of a quality function for the point cloud, the method may evaluate bi-direction data only once to reduce computation time.

In the step of maximising the value of a quality function for the point cloud, the method may evaluate an entropy contribution between a point of the point cloud and neighbouring points in the point cloud to reduce computation time.

The point cloud data may be stored in a tree data structure for processing, such as a k-d tree.

According to another aspect of the present invention there is provided transportable apparatus including at least one sensor and a processor configured to execute a method substantially as described herein.

According to another aspect of the present invention there is provided a method of calibrating at least one sensor mounted on transportable apparatus, the method including:

receiving data representing pose history of the transportable apparatus;

receiving sensor data from at least one sensor mounted on transportable apparatus;

generating at least one point cloud datum using the sensor data received from the at least one sensor, each point in a said point cloud having a point covariance derived from the pose history data;

maximising a value of a quality function for the at least one point cloud;

using the maximised quality function to determine extrinsic calibration parameters for the at least one sensor, and calibrating the at least one sensor using the determined extrinsic calibration parameters.

According to yet another aspect of the present invention there is provided a vehicle including transportable apparatus substantially as described herein.

According to other aspects of the present invention there are provided computer program elements comprising: computer code means to make the computer execute methods substantially as described herein. The element may comprise a computer program product.

According to other aspects of the present invention there is provided apparatus including a processor configured to execute methods substantially as described herein.

According to yet another alternative aspect of the present invention there is provided a method of determining extrinsic calibration parameters between 2D and 3D LIDAR sensors with respect to a vehicle base frame including the step of recovering the calibration parameters by optimising the quality of a 3D point cloud produced by the vehicle while traversing an environment.

The environment may be unknown and/or unmodified. The step of optimising the quality of the 3D point cloud can be carried out using an entropy-based point cloud quality metric. The entropy-based point cloud quality metric may require only one tuning parameter. A tree-based implementation can be created to allow calibration in large test environments involving millions of laser points.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

Figure 1:
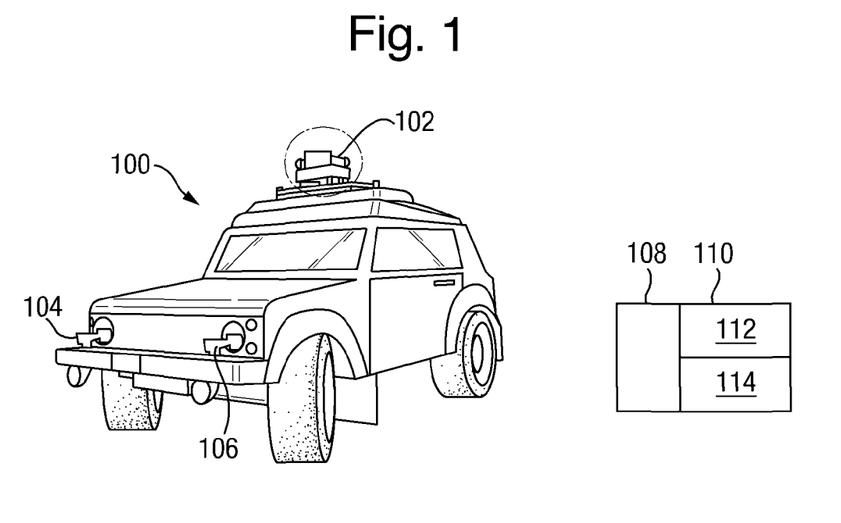
FIG. 1 illustrates an example vehicle having sensors.

FIG. 1 shows an example vehicle 100 having a first sensor in the form of a roof-mounted spinning 3D LIDAR 102, and second and third sensors in the form of 2D LIDARs 104, 106 mounted on the front bumper at different elevation angles. In the illustrated embodiment the sensors are LIDAR devices, but it will be understood that these could be replaced by any suitable ranging sensors (e.g. a laser scanner or sonar device) and their mounting positions/orientations can also be varied.

The vehicle 100 further includes an Inertial Navigation System (INS) mounted over its rear axle and schematically illustrated at 108 in the Figure. Also shown is a computing device 110 having a processor 112 and memory 114 configured to determine calibration parameters using a method as described herein. In other embodiments, such a computing device may be located remotely from the vehicle and be in communication over a network or communications link with the vehicle-mounted sensors. Although the example vehicle 100 is a land-based vehicle travelling along a road/ground surface, it will be appreciated that in alternative embodiments, the vehicle could be any type of vehicle that may be travelling above (and not necessarily in contact with) a surface that can be scanned. Further, in other embodiments, the sensors and the computing device need not be fitted to/on a vehicle, but can be included in a hand-held navigation device, for example. In use, the vehicle travels along a surface 120 and the sensors capture data relating to the scene around and below the vehicle.

The approach described herein is not limited to a particular configuration of sensors, but the illustrated example is specifically concerned with the case of a mobile platform with at least one 3D LIDAR and any number of 2D LIDARs, all of which are rigidly attached to the vehicle 100. The platform also provides a mechanism for determining the vehicle trajectory, in order that LIDAR measurements may be projected relative to it. This trajectory needs only to be locally metrically accurate; global metric accuracy is not necessary. Thus, it could come from a GPS+ Intertial system, relative visual odometry, or a LIDAR SLAM system, for example.

Figure 2:
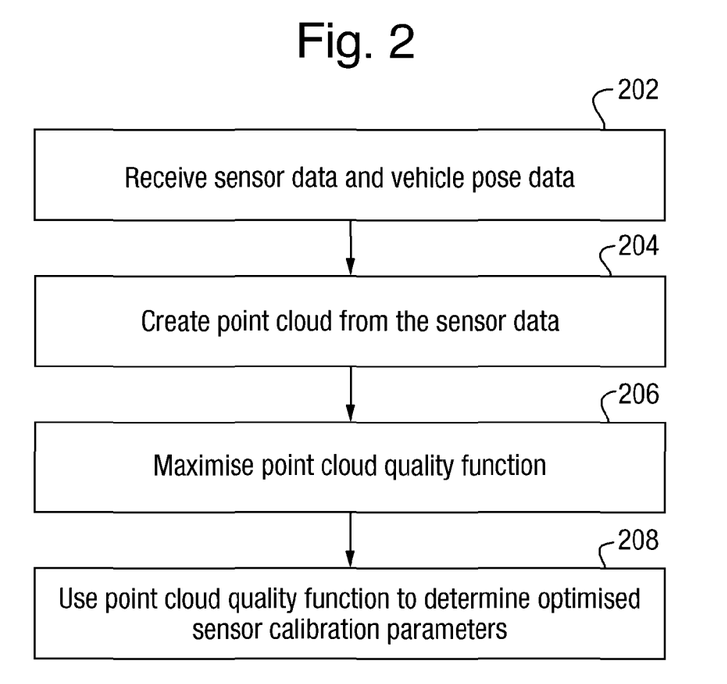
FIG. 2 is a flowchart illustrating steps performed by an embodiment.

FIG. 2 illustrates schematically an example of main steps involved in the calibration parameter determining method, which can be implemented on the computing device 110 of the vehicle 100, for example. The skilled person will appreciate that these steps are exemplary only and that in alternative embodiments, some of them may be omitted and/or re-ordered. Further, the method can be implemented using any suitable programming language and data structures.

At step 202, an implementation of the method in the form of code executing on the computing device 110 receives data from one or more of the sensors 102, 104, 106 that are mounted on the vehicle 100. It will be appreciated that the data can be transferred by any suitable means (e.g. wired or wireless communications link) and can be in any suitable format. In some cases data conversion, compression and/or encryption techniques may be applied. In the example, the data from all three sensors 102, 104, 106 is received so that all three sensors can be calibrated in the same way with respect to the vehicle frame, but it will be appreciated that in other embodiments, the sensors to be calibrated may be automatically or manually selected.

At step 204, data representing a point cloud is created based on the data received from each of the sensors 102, 104, 106. An example method for creating point clouds will be described below, but it will be understood that any suitable technique and data structure/format can be used. The point clouds are then stored, at least temporarily, in the memory 114 of the computing device 110.

At step 206, data representing each point cloud is applied to a cost/quality function and, as detailed below, this function is maximised. At step 208, extrinsic calibration parameters for each of the sensors 102, 104, 106 are determined based on the computation performed at step 206. The computing device 110 can then automatically calibrate one or more of the sensors via a suitable interface, or in other cases, data regarding the computed calibration parameters may be stored or transferred for future use, e.g. by a human operator.

The method is able to make use of the relative covariance between points and so a system that provides that is preferable. In the illustrated embodiment, an accurate INS 108 is used to provide pose error estimates (the state covariance matrix from a Kalman filter used to combine inertial data with GPS). It is assumed that the intrinsics of each sensor 102, 104, 106 have been correctly calibrated; the ranges reported by each LIDAR relative to the sensor base frame must be locally consistent. For single-beam 2D LIDARs the factory calibration is generally sufficient; in the case of Velodyne or other multi-beam 3D LIDAR, additional intrinsic calibration stages may be necessary to achieve the desired accuracy.

A description will now be given of the derivation of the kinematic chain for the platform 100 and sensors 102, 104, 106 based on a global trajectory estimate. This is not a specific requirement for all embodiments of the method and in some cases it can work equally well on relative trajectory segments using a sliding-window approach to bring the trajectory into a local metric frame. The skilled person will appreciate that it is possible to implement the method based on the equations and calculations given below or any mathematical equivalents.

Considering a 3D LIDAR L which takes measurements $Z=\{z_1 \ldots z_N\}$, where each measurement consists of a point $z_i=[x_i,y_i,z_i]$ in the sensor base frame and corresponds to an object in the world $X=\{x_1 \ldots x_N\}$. The history of vehicle poses is denoted by $Y=\{y_i \ldots y_N\}$, where each pose consists of a global location and orientation $y_i=[x_{Gi}, y_{Gi}, z_{Gi}, \alpha_{Gi}, \beta_{Gi}, \phi_{Gi}]^T$ and covariance matrix $Q_i$. The sensor model h is defined as $z_i=h(x_i|y_i, \Box)$, where $\Box$ is the set of six extrinsic calibration parameters which define the local offset between the vehicle origin and the sensor base frame:

$$\Theta=[x_L, y_L, z_L, \alpha_L, \beta_L, \phi_L]^T \qquad (1)$$

To estimate the position of the measured points $x_i$, given the measurements and global poses, the inverse sensor model $\hat{x}_i = h^{-1}(z_i|y_i, \Box)$, is applied, which corresponds to the kinematic chain.

$$h^{-1}(z_i|y_i,\Theta)=T(x^{Gi},y_{Gi},z_{Gi})R(\alpha_{Gi},\beta_{Gi},\phi_{Gi})T(x_L,y_L,z_L)R(\alpha_L,\beta_L,\phi_L)z_i \qquad (2)$$

Here, T(x,y,z) represents a translation along each respective axis and R($\alpha$, $\beta$, $\gamma$) represents a rotation of roll angle $\alpha$, pitch angle $\beta$ and yaw angle $\gamma$. The covariance of each estimated point due to global position error is calculated as follows:

$$\Sigma_i = J_i Q_i J_i^T, \text{ where } J_i = \frac{\delta h^{-1}(z_i | y_i, \Theta)}{\delta y_i} \qquad (3)$$

Combining the estimated position of objects over a series of measurements produces an estimated point cloud $X=\{x_i \ldots x_N\}$ with point covariances $\Sigma=\{\Sigma_i \ldots \Sigma_N\}$ The quality of the measured point cloud $\hat{X}$ is not only dependent on the extrinsic calibration parameters but also the accuracy of the timestamps for each measurement. As embodiments can calibrate multiple heterogeneous sources of measurements, each with its own internal clock, the method can require a way of mapping timestamps from measurement devices to a central clock. In some embodiments, the TICSync library (see A. Harrison and P. Newman, "TICSync: Knowing when things happened," in Proc. IEEE International Conference on Robotics and Automation (ICRA2011), (Shanghai, China), May 2011) is used to determine the frequency and offset of each measurement device clock relative to the central clock. This can be performed online using a variant of the efficient convex hull algorithm outlined in L. Zhang, Z. Liu, and C. Honghui Xia, "Clock synchronization algorithms for network measurements," in INFOCOM 2002. Twenty-First Annual Joint Conference of the IEEE Computer and Communications Societies. Proceedings. IEEE, vol. 1, pp. 160-169, IEEE, 2002.

Using only the history of measurements Z and vehicle poses Y, the method is able to maximize the value of a point cloud quality function E ($\Box$|Z, Y) providing the most likely estimate for the extrinsic calibration parameters $\Box$. It can be desirable to define this quality function as a measure of point cloud 'crispness' without making assumptions about the underlying structure of the calibration environment (such as requiring the existence of large planar surfaces). The preferred cost function is based on Renyi Quadratic Entropy (RQE) because it offers excellent performance, a large convergence basin, makes no explicit assumptions about the environment and requires only a single tuning parameter. It will be appreciated that alternative embodiments can use non-RQE metrics, but the advantage of RQE is that there is a closed-form solution when it is applied to mixtures of Gaussians and so other measures may be harder to compute, although other measures which correlate to point cloud 'crispness' could be produced.

It is assumed that the point cloud measurements $X=\{\hat{x}_1 \ldots \hat{x}_N\}$ are drawn from an underlying distribution p(x), which represents the probability of drawing a measurement from a location x. Embodiments apply Parzen Window density estimation (see E. Parzen, "On estimation of a probability density function and mode," The annals of mathematical statistics, vol. 33, pp. 1065-1076, January 1962) to represent p(x) as a Gaussian Mixture Model (GMM)

$$p(x) = \frac{1}{N}\sum_{i=1}^{N} G(x - \hat{x}_i, \Sigma_i + \sigma^2 I) \qquad (4)$$

where $G(x-\mu, \Sigma)$ is a Gaussian with mean $\mu$ and covariance $\Sigma$. Embodiments use an isotropic kernel with variance $\sigma^2$ convolved with the vehicle localization uncertainty $\Sigma_i$ for each measurement. The parameter $\sigma$ is the only tuning parameter of the system being related to the expected measurement noise of the sensor, and the sampling density of the dataset. The 'crispness' of the point cloud can now be expressed in terms of the entropy of $p(x)$.

An entropy measure proposed by Rényi in A. Rényi, "On measures of entropy and information," in Fourth Berkeley Symposium on Mathematical Statistics and Probability, pp. 547-561,1961, offers an efficient way to quantify the compactness of a GMM distribution (see J. Principe and D. Xu, "Information-theoretic learning using Renyi's quadratic entropy," in Proceedings of the 1st International Workshop on Independent Component Analysis and Signal Separation, Aussois, France, pp. 407-412, Citeseer, 1999). Specifically, the Renyi Quadratic Entropy of a stochastic variable X with probability density $p(x)$ is defined as $$H_{RQE}[X] = -\log \int p(x)^2 dx. \quad (5)$$

Substituting the Gaussian Mixture Model of Equation 4 into equation 5 gives $$H_{RQE}[\hat{X}] = -\log \int \left( \frac{1}{N} \sum_{i=1}^{N} G(x - \hat{x}_i, \Sigma_i + \sigma^2 I) \right)^2 dx \quad (6)$$

$$= -\log \left( \frac{1}{N^2} \sum_{i=1}^{N} \sum_{j=1}^{N} \int G(x - \hat{x}_i, \Sigma_i + \sigma^2 I) G(x - \hat{x}_j, \Sigma_j + \sigma^2 I) dx \right)$$

By noting the following Gaussian integral identity, $$\int G(x - \hat{x}_1, \Sigma_1) G(x - \hat{x}_2, \Sigma_2) dx = G(\hat{x}_1 - \hat{x}_2, \Sigma_1 + \Sigma_2), \quad (7)$$

simplification of Equation 6 yields a closed-form representation for the Renyi Quadratic Entropy of the GMM:

$$H_{RQE}[\hat{X}] = -\log \left( \frac{1}{N^2} \sum_{i=1}^{N} \sum_{j=1}^{N} G(\hat{x}_i - \hat{x}_j, \Sigma_i + \Sigma_j + 2\sigma^2 I) \right) \quad (8)$$

This expression can be interpreted as an information-theoretic measure of the compactness of the points in $\hat{X}$. For the purposes of optimization it is noted that log is a monotonic operator and that the scale factor is unnecessary, so these terms are removed to produce the point cloud quality function:

$$E[\hat{X}] = \sum_{i=1}^{N} \sum_{j=i}^{N} G(\hat{x}_i - \hat{x}_j, \Sigma_i + \Sigma_j + 2\sigma^2 I). \quad (9)$$

For a given value of $\sigma$, the cost function depends only on pairwise distances between points in $\hat{X}$ and the associated global position uncertainty $\Sigma$ of each point. As it stands, this has an $O(N^2)$ evaluation cost, but an efficient approximation is presented below.

Given a vehicle trajectory and recordings of multiple 2D and 3D LIDAR's $L_1 \ldots L_n$, it is desired to estimate the relative locations $\theta_1 \ldots \theta_n$ of each LIDAR. This requires movement of the platform 100 as objects in the environment must be observed from at least two locations. To effectively constrain the calibration axes, the vehicle trajectory must include periods of acceleration in all 6 degrees of freedom. It is assumed that an initial guess $\theta_0$ is available from manual measurements of each sensor's location, though these need not be highly accurate. No assumptions are made about the environment other than that it is generally static.

As a 3D LIDAR provides good coverage of the local environment, the calibration of offsets between a 3D LIDAR and the vehicle INS system can be straightforward since the vast majority of measurements to objects X are made from at least two locations. The point cloud quality function is formed by substituting the inverse sensor model into the cost function of Equation 9.

$$E(\Theta | Z, Y) = \quad (10)$$

$$\sum_{i=1}^{N} \sum_{j=1}^{N} G(h^{-1}(z_i | y_i, \Theta) - h^{-1}(z_j | y_j, \Theta), J_i Q_i J_i^T + J_j Q_j J_j^T + 2\sigma^2 I)$$

The optimal offset parameters $\hat{\theta}$ are recovered by non-linear maximization of the cost function, so that $$\hat{\Theta} = \underset{\Theta}{\operatorname{argmax}} E(\Theta | Z, Y) \quad (11)$$

As the cost function makes use of convolved Gaussians which have continuous analytical derivatives, the optimization can be performed using Newton's method or other gradient-based optimization algorithms.

Once the vehicle has calibrated 3D LIDAR, the method can use the structure of the global 3D point cloud (or locally metrically accurate sections rendered from a relative trajectory) to calibrate the 2D LIDAR. To achieve this, embodiments use the Renyi Information Potential (see Srinivasan, B. V. and Duraiswami, R., Efficient subset selection via the kernelized Renyi distance, Computer Vision, 2009 IEEE 12th International Conference on, 2009, pp 1081-1088, IEEE) between the two point clouds, which boils down to finding the entropy contribution of only the cross-terms between the proposed 2D LIDAR point cloud and the calibrated 3D LIDAR point cloud. Intuitively, the optimization should not be dominated by the intrinsic crispness of either point cloud; it is their similarity that it is desired to maximize. Given a set Z of N observations from a 2D LIDAR, a corresponding set of global poses Y and a set $\hat{X}$ of M calibrated points from a 3D LIDAR (with corresponding covariances $\Sigma$), taking the Kernelized Renyi Distance between the two point clouds leads to a cross-term entropy function, $$E(\Theta | Z, Y, \hat{X}) = \sum_{i=1}^{N} \sum_{j=1}^{M} G(h^{-1}(z_i | y_i, \Theta) - \hat{x}_j, J_i Q_i J_i^T + \Sigma_j + 2\sigma^2 I) \quad (12)$$

The offset between the 2D LIDAR and the vehicle frame is recovered by maximization of this cost function, so that $$\hat{\Theta} = \underset{\Theta}{\operatorname{argmax}} E(\Theta | Z, Y, \hat{X}) \quad (13)$$

Once again the method can apply a Newton method to perform the optimization, as for the 3D LIDAR discussed above.

The cost function of Equation 9 is $O(N^2)$ (where N is the size of the point cloud) as it requires the computation of all pairwise entropy contributions. For larger environments this becomes prohibitively expensive, so the inventors now present a series of computational enhancements to keep the optimization tractable. One improvement can be found by seeing that Equation 9 evaluates contributions for each pair of points twice—once in each direction. Computation time can be halved by evaluating in one direction only, so that $$E[\hat{X}] = 2\sum_{i=1}^{N}\sum_{j=i}^{N} G(\hat{x}_i - \hat{x}_j, \Sigma_i + \Sigma_j + 2\sigma^2 I). \quad (14)$$

It will be noted that the inner sum now only covers the range [i, n]. Given that the typical values chosen for σ are small relative to the absolute size of the global point cloud, it is likely that the vast majority of point pairs produce negligible entropy contributions. As the method has knowledge of the location and covariances of each point pair it can set an upper bound on the pairwise distance above which all entropy contributions are negligible:

$$G(x-\mu, \Sigma) \approx 0, \forall x: \|x-\mu\| \geq k\lambda_1(\Sigma) \quad (15)$$

Here is adopted the spectrum notation for eigenvalues, where the eigenvalues of an n×n Hermitian matrix A are represented as the ordered set $\{\lambda_1(A) \geq \lambda_2(A) \geq \ldots \lambda_n(A)\}$. The parameter k is used to adjust the threshold as a proportion of the maximum eigenvalue $\lambda_1(\Sigma)$. Use of this approximation greatly sparsifies the structure of the cost function since it is not necessary to evaluate spatially distant point pairs. Notice that using this approximation in the RQE cost function threshold, $$\|\hat{x}_i - \hat{x}_j\| \geq k\lambda_1(\Sigma_i + \Sigma_j + 2\sigma^2 I)$$

Since this depends on the covariance of both points, it still requires visits to all possible pairs. Covariance matrices are symmetric positive-definite and therefore Hermitian. For Hermitian matrices the following inequality holds:

$$\lambda_1(\Sigma_1) + \lambda_1(\Sigma_2) \geq \lambda_1(\Sigma_1 + \Sigma_2)$$

which leads to a more conservative threshold $$\lambda_1(\Sigma_i + \Sigma_j + 2\sigma^2 I) \leq \lambda_1(\Sigma_i) + \lambda_1(\Sigma_j) + 2\sigma^2 \leq 2\max(\lambda_1(\Sigma_i), \lambda_1(\Sigma_j)) + 2\sigma^2 \quad (16)$$

This new form allows obtaining of an efficient algorithm for approximate RQE evaluation. First the maximum eigenvalues are computed for all point covariances, $\Sigma_i \in \Sigma$ in $O(N)$ time. It then sorts the points in descending order by their maximum eigenvalue, and iterates through them. For each point the method performs a search for all other points within a radius $R_i = 2k(\lambda_1(\Sigma_i) + \sigma_2)$. Finally, the method evaluates the entropy contribution between $\hat{x}_i$ and all neighbours that appear later in the list (thus having smaller maximum eigenvalue). Crucially, this ensures that entropy contributions are computed in one direction only, and that the search neighbourhood is monotonically decreasing as evaluation of the cost function progresses. Algorithm 1 below shows the key steps.

```
Algorithm 1 Fixed-radius approximate RQE
 1:    procedure RQEAPPROX (X̂, Σ, σ, k)
 2:        E ← 0
 3:        λ_{1...N} ← [MAXEIGENVAL(Σ_i) | i ∈ [1...N]]
 4:        ▷ Rank λ_{1...N} so that λ_{ri} ≤ λ_{ri-1} ∀i ∈ [2...N]
 5:        r_{1...N} ← RANKORDERDESENDING(λ_{1...N})
 6:        for i ← 1, N do
 7:            R ← 2k (λ_{ri} + σ²)▷ Search radius
 8:            for all j ∈ NEIGHBORHOOD(x̂_{ri}, X̂, R) do
 9:                if λ_{ri} > λ_{rj} then
10:                    E ← E +G (x̂_{ri} − x̂_j, Σ_{ri} + Σ_j + 2σ²I)
11:                end if
12:            end for
13:        end for
14:        return 2E              ▷ The RQE result
15:    end procedure
```

It will be noted that two components of this algorithm are particularly suited for the application of tree-based data structures; the eigenvalue ranking function r(i) can be efficiently generated using an $O(N \log N)$ sort, and the point cloud $\hat{X}$ can be stored in a k-d tree which allows fixed radius neighbourhood searches in worst-case $O(N^{2/3}+p)$ time, where p is the number of neighbours retrieved. For large datasets, these tree-based representations provide significant computational savings over exhaustive searching of the point cloud, delivering a cost function that may be evaluated in $O(N \log N + N^{5/3} + Np^-)$ time, where $p^-$ is the mean neighbourhood size retrieved by the k-d tree.

Experiments involving the method and their results will now be described. The mobile platform used for the experiments is the known Wildcat vehicle 100, pictured in FIG. 1. Vehicle pose is provided by an Oxford Technical Solutions (OxTS) RT-3042, which combines inertial measurements with differential GPS updates using a Kalman filter. 6-DoF pose estimates and pose uncertainty estimates are provided at 100 Hz with a stated position accuracy of 0.4 m CEP and orientation accuracy of 0.03° (1σ) in pitch and roll and 0.1° (1σ) in yaw. The Wildcat is equipped with a roof-mounted 3D LIDAR comprising of 3 SICK LMS-151 sensors fixed to a rotating plate, and a pair of front bumper mounted SICK LMS-151 sensors. Each LMS-151 has a field of view of 270 degrees and a measurement range of 50 m with a stated accuracy of 12 mm (1σ).

The calibration experiments were conducted at the Begbroke Science Park near Oxford, UK. The Wildcat was driven multiple times around the 0.7 km perimeter road, passing natural features such as trees and hedges along with manmade features such as buildings, car parks and road signs. No reflective markers or other calibration aids were placed in the environment, and the only environment-specific aspect to data collection was the choice of collection time (to minimize the number of pedestrians, cars and other dynamic objects in the data). The trajectory was spliced into 20 distinct 'locations' and an independent calibration performed for each one, in order to quantify the precision of the method.

Data from the INS, 3D LIDAR and 2D LIDARs was recorded using the on-board PC and the calibration was performed as an off-line process for convenience, though an online implementation is also possible. The core algorithm to evaluate the cost function was implemented in C++, taking advantage of a known 'eigen' library for matrix manipulation and eigendecomposition and a k-d tree based approximate nearest neighbour library for the fixed-radius search.

Table 1 below lists the extrinsic calibration values determined for the 3D LIDAR and the downward-facing 2D LIDAR for σ=5 mm aggregated over 20 different locations.

The mean 3D LIDAR calibration was used to generate the global point cloud for calibration of the 2D LIDAR.

|  | 3D LIDAR | | | 2D LIDAR | | |
|---|---|---|---|---|---|---|
|  | Seed value | Mead | Std Dev | Seed value | Mean | Std Dev |
| $x_L(m)$ | 1.13 | 1.153 | 0.004 | 3.3 | 3.269 | 0.020 |
| $y_L(m)$ | 0 | 0.000 | 0.001 | 0.67 | 0.761 | 0.013 |
| $z_L(m)$ | −1.13 | −1.145 | 0.005 | 0.4 | 0.390 | 0.011 |
| $\alpha_L(°)$ | 0 | 0.006 | 0.001 | −8 | −6.904 | 0.299 |
| $\beta_L(°)$ | 0 | 0.002 | 0.001 | 180 | 179.03 | 0.466 |
| $\phi_L(°)$ | 90 | 99.639 | 0.257 | 270 | 270.18 | 0.210 |

It will be noted that there is a large difference between the manually measured yaw angle and the calibrated yaw angle of the 3D LIDAR. This is not due to a physical 9.6° mounting error of the base plate; the intrinsic calibration of the 3D LIDAR performed does not derive the angular offset between the base plate and the encoder origin, so it manifests itself as a rotation of the sensor frame.

Figure 3:
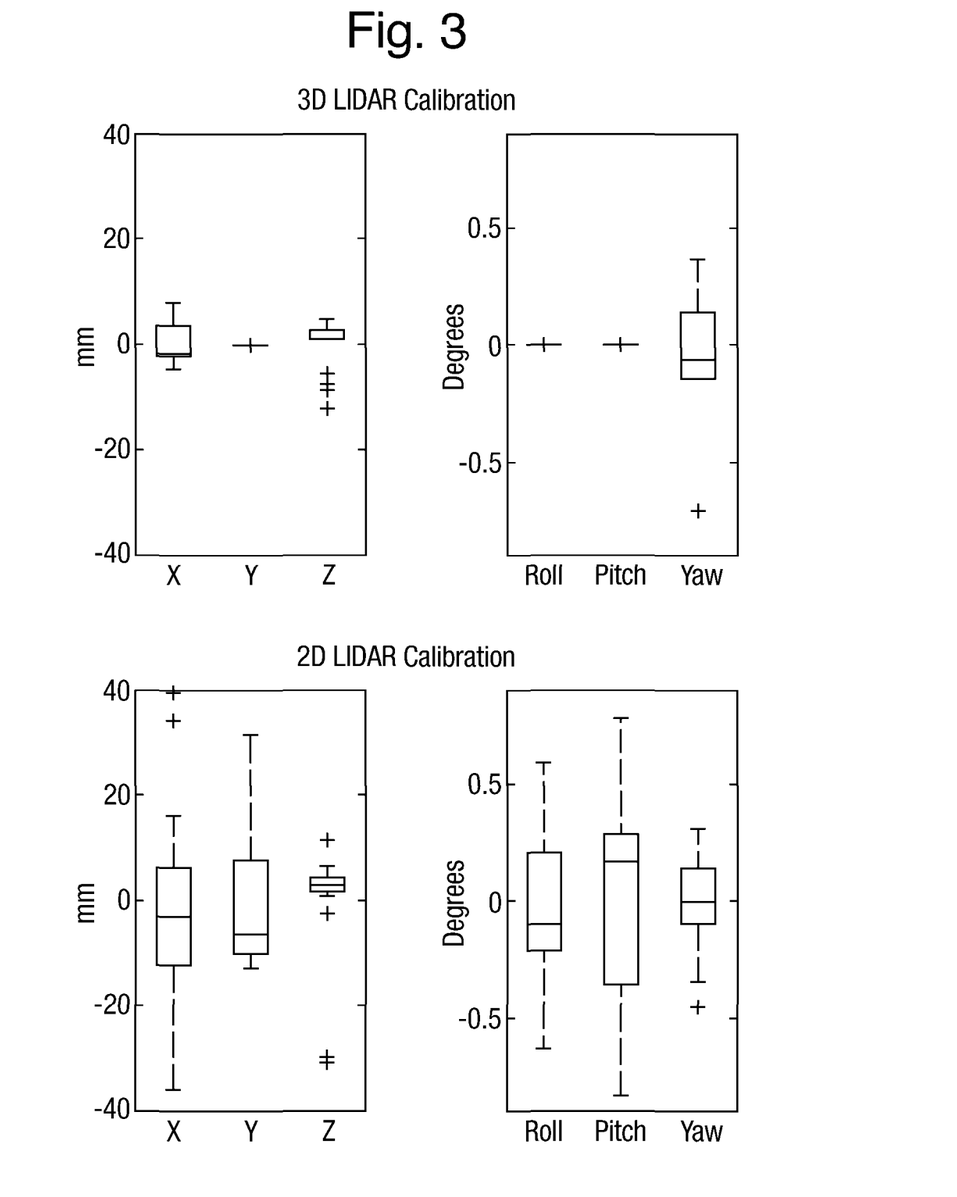
FIG. 3 shows box-plots based on test data

FIG. 3 illustrates the distribution of extrinsic parameters across all 20 different calibration locations. To facilitate comparison between axes, the mean value for each axis has been subtracted.

Figure 4:
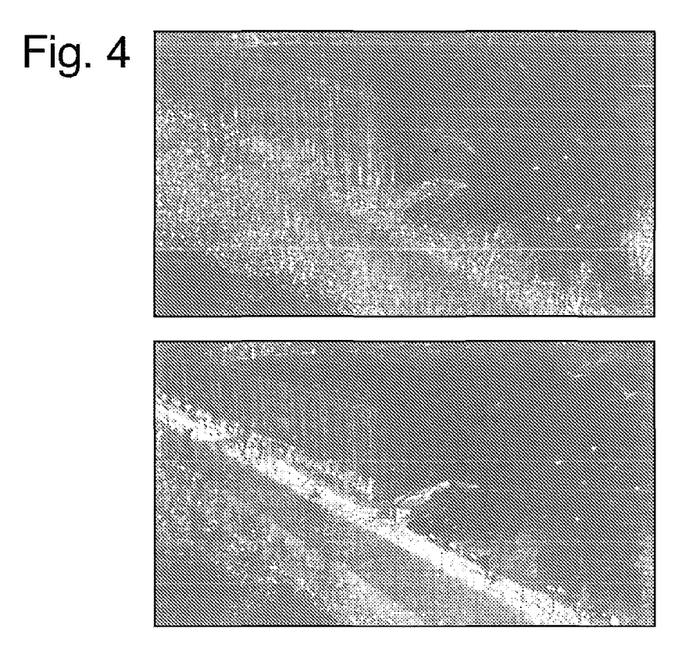
FIG. 4 show example point cloud visualisations based on test data.

FIG. 4 presents qualitative results in the form of a visualization of the point clouds produced by the 2D and 3D LIDAR before and after calibration. The calibrated point cloud appears crisp and the correspondence between the 2D and 3D LIDAR is apparent. The 2D LIDAR is angled downwards by 8°, and therefore covers a volume up to 2 m above the ground plane. In the lower image, good calibration is evident between the two point clouds, particularly on sections of the building, lamp posts and automobiles.

Figure 5:
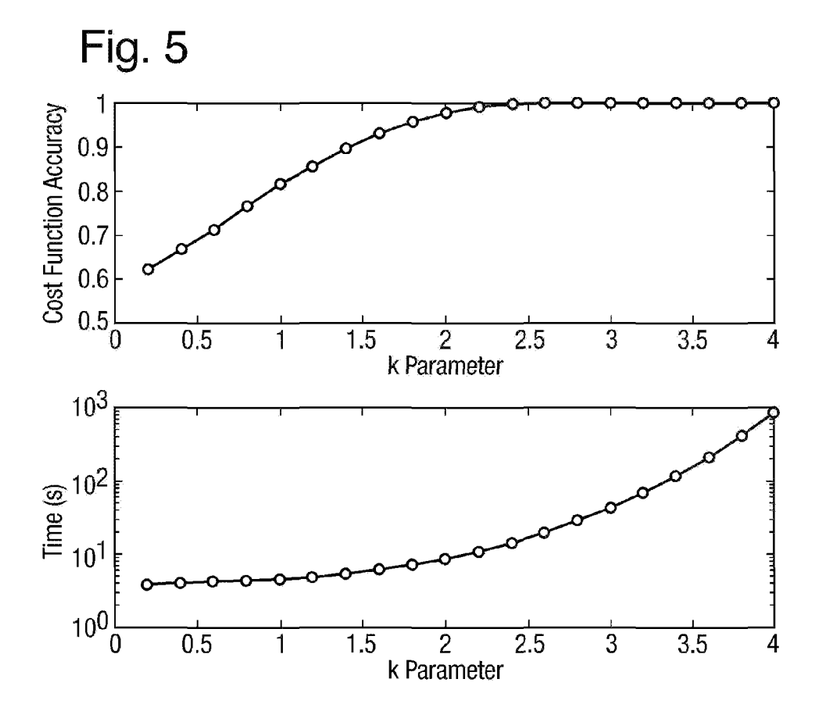
FIG. 5 shows graphs illustrating test data.

FIG. 5 demonstrates how, for an 800,000 point section of the dataset, the efficiency and accuracy of the approximate RQE method vary with the k parameter. All experiments were performed using a single core of a 2.2 GHz Intel Core i5 processor. The exhaustive pairwise approach requires over 15,000 seconds to evaluate the RQE cost function. The approximate method requires only 7 seconds to calculate a cost value within 5% of the exhaustive method and only 20 seconds to evaluate a cost value within 0.1% of the exhaustive method.

In certain sections of the driven trajectory during the experiment, the vehicle 100 lost GPS lock when it passed under trees or close to buildings, which explains some of the calibration outliers for certain locations. Nonetheless, the results demonstrate good precision for the 3D LIDAR extrinsic calibration algorithm, with lateral and vertical displacement tightly pinned down. The greater variation in x (forwards/backwards) is likely down to the manner in which the data was gathered; most of the time the vehicle was driving straight on open road with free space in front and behind and relatively featureless buildings or bushes to the sides. Thus, a calibration error in x simply shifts the points in a way which does not significantly affect the 'crispness' of the point cloud. Conversely, an error in lateral calibration is quickly identified by a pitching or rolling motion, which would cause the observations of the walls of the building to distort. The inventors believe that the results would improve further by exacerbating the vehicle rotations, such as by performing rapid braking manoeuvres or driving on uneven terrain. The 2D LIDAR calibration is unsurprisingly not as precise as the 3D calibration, yet it certainly has greater precision than would be achieved by hand. Again, deliberate attempts to exercise all 6 degrees of freedom of the vehicle in a suitably complex environment would yield greater precision.

Empirically, it was found that the basin of convergence for the full RQE cost function with wide kernels is impressively large, with successful convergence from initial guesses of a meter away. As the a value (and therefore the radius of influence of each point) is reduced, the algorithm becomes faster and the convergence basin shrinks gracefully.

The inventors performed a second set of experiments where they made no use of the measurement covariances from the INS. In most cases precision was around 5 times lower, which clearly shows the benefit of using non-isotropic kernels.

Although some embodiments obtain the vehicle trajectory using the INS, there is no reason why it should not come from a different source such as visual odometry or LIDAR SLAM, even if the trajectory is only locally metrically accurate.

The inventors have presented a method for fully automatic extrinsic calibration between 2D and 3D LIDAR sensors and the vehicle frame. Their algorithm has a principled information theoretic basis and has only two tuning parameters. It provides significant computational savings over an exhaustive RQE evaluation, in exchange for a graceful degradation of accuracy and convergence basin. This rapid and repeatable calibration in unstructured natural environments (without the need for special calibration targets) results in a procedure which can tractably be performed on-line. What the inventors have proposed and demonstrated is in stark contrast to the traditional approach of carrying out infrequent and expensive manual calibrations whenever the sensors are adjusted. This is no-hassle calibration. Embodiments of the method have been analysed using real world data gathered in many locations, showing robust calibration performance and substantial speed improvements from the approximations.

Embodiments of the method have a number of advantages over existing methods; primarily, the method makes minimal assumptions about the test environment and do not require any environment modification (such as placement of calibration targets). Embodiments use an entropy-based point cloud quality metric which is well grounded in information theory, provides a wide basing of convergence and require only one tuning parameter. Embodiments can exploit properties of the entropy formulation to create an efficient tree-based implementation; this allows calibration in large test environments with millions of laser points. Such embodiments can add on a single tuning parameter, which gracefully trades accuracy for speed.

The invention claimed is:

1. A method of determining extrinsic calibration parameters for at least one sensor mounted on a transportable apparatus, the method including:
   receiving, by a computer processor, data representing pose history of the transportable apparatus with respect to a global frame;
   receiving, by the computer processor, sensor data from at least one sensor mounted on the transportable apparatus;
   generating, by the computer processor, at least one point cloud datum using the sensor data received from the at least one sensor, each point in a said point cloud having a corresponding point covariance derived from the pose history data;
   maximizing, by the computer processor, a value of a quality function for the at least one point cloud; and
   determining, by the computer processor, extrinsic calibration parameters for the at least one sensor using the maximized quality function.

2. A method according to claim 1, wherein the value of the quality function depends on pairwise distances between said points in a said point cloud ($\hat{X}$) and associated said point covariance ($\Sigma$) of each said point derived from the pose history data.

3. A method according to claim 1, wherein the quality function (E) is expressed as $E(\Theta|Z, Y)$, where Z represents the data received from one said sensor, the sensor data representing a set of measurements over a period of time, and where Y represents a set of poses of the transportable apparatus from the pose history over the period of time, and where $\Theta$ provides a most likely estimate for the extrinsic calibration parameters for the sensor.

4. A method according to claim 1, wherein the quality function comprises an entropy-based point cloud quality metric.

5. A method according to claim 4, wherein the quality function is based on Renyi Quadratic Entropy.

6. A method according to claim 1, wherein the maximizing of the value of the quality function is performed using Newton's method.

7. A method according to claim 1, wherein the method is used to:
generate a first point cloud based on sensor data received from a 3D LIDAR device;
generate a second point cloud based on sensor data received from a 2D LIDAR device, and
use a Kernelized Renyi Distance function on the first and the second point clouds to determine the extrinsic calibration parameters for the 2D LIDAR device.

8. A method according to claim 1, where, in the step of maximizing the value of a quality function for the point cloud, the method evaluates bi-direction data only once to reduce computation time.

9. A method according to claim 1, where, in the step of maximizing the value of a quality function for the point cloud, the method evaluates an entropy contribution between a first said point of the point cloud and neighbouring said points in the point cloud to reduce computation time.

10. A method according to claim 1, wherein the point cloud data is stored in a tree data structure for processing.

11. A method according to claim 10, wherein the tree data structure comprises a k-d tree.

12. Transportable apparatus including at least one sensor and a processor configured to execute a method according to claim 1.

13. A vehicle including transportable apparatus according to claim 12.

14. A method of calibrating at least one sensor mounted on a transportable apparatus, the method including:
receiving, by a computer processor, data representing pose history of the transportable apparatus, the pose history data representing at least two different locations of the transportable apparatus within a global frame;
receiving, by the computer processor, sensor data from at least one sensor mounted on the transportable apparatus, the sensor data representing coordinates of an object in a sensor frame that is different than the global frame, the sensor data being obtained while the transportable apparatus is located at each of the at least two different locations of the transportable apparatus in the pose history data;
estimating, by the computer processor, coordinates of the object in the global frame based on the sensor data received from the at least one sensor;
generating, by the computer processor, point cloud data by combining the estimated coordinates of the object in the global frame with corresponding point covariences derived from the pose history data;
maximizing, by the computer processor, a value of a quality function for the point cloud;
determining, by the computer processor, extrinsic calibration parameters for the at least one sensor using the maximized quality function, and
calibrating the at least one sensor using the determined extrinsic calibration parameters.

15. A non-transient computer program product comprising computer code that when executed by one or more processors causes a process for determining extrinsic calibration parameters for at least one sensor mounted on a transportable apparatus, the process comprising:
receiving data representing pose history of the transportable apparatus with respect to a global frame;
receiving sensor data from at least one sensor mounted on the transportable apparatus;
generating at least one point cloud datum using the sensor data received from the at least one sensor, each point in a said point cloud having a corresponding point covariance derived from the pose history data;
maximizing a value of a quality function for the at least one point cloud; and
using the maximized quality function to determine extrinsic calibration parameters for the at least one sensor.

16. A computer program product according to claim 15, wherein the value of the quality function depends on pairwise distances between said points in a said point cloud ($\hat{X}$) and associated said point covariance ($\Sigma$) of each said point derived from the pose history data.

17. A computer program product according to claim 15, wherein the quality function (E) is expressed as $E(\Theta|Z, Y)$, where Z represents the data received from one said sensor, the sensor data representing a set of measurements over a period of time, and where Y represents a set of poses of the transportable apparatus from the pose history over the period of time, and where $\Theta$ provides a most likely estimate for the extrinsic calibration parameters for the sensor.

18. A computer program product according to claim 15, wherein the quality function comprises an entropy-based point cloud quality metric and the maximizing of the value of the quality function is performed using Newton's method.

19. A computer program product according to claim 15, wherein the process is used to:
generate a first point cloud based on sensor data received from a 3D LIDAR device;
generate a second point cloud based on sensor data received from a 2D LIDAR device, and
use a Kernelized Renyi Distance function on the first and the second point clouds to determine the extrinsic calibration parameters for the 2D LIDAR device.

20. A computer program product according to claim 15, wherein the point cloud data is stored in a tree data structure for processing, and the tree data structure comprises a k-d tree.

* * * * *